(12) United States Patent
Sah

(10) Patent No.: US 7,585,249 B2
(45) Date of Patent: Sep. 8, 2009

(54) APPARATUS AND METHOD TO CONTROL TRANSMISSION TORQUE OUTPUT DURING A GEAR-TO-GEAR SHIFT

(75) Inventor: Jy-Jen F. Sah, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 615 days.

(21) Appl. No.: 11/428,030

(22) Filed: Jun. 30, 2006

(65) Prior Publication Data

US 2008/0004779 A1    Jan. 3, 2008

(51) Int. Cl.
    *B60K 1/02*    (2006.01)
(52) U.S. Cl. .......................................................... 477/3
(58) Field of Classification Search ...................... 477/3, 477/906; 903/911, 945
    See application file for complete search history.

(56) References Cited

U.S. PATENT DOCUMENTS

| | | | |
|---|---|---|---|
| 6,751,960 B2 * | 6/2004 | Arimitsu et al. ............... | 60/706 |
| 6,915,782 B2 * | 7/2005 | Hanada et al. ............... | 123/399 |
| 7,017,348 B2 * | 3/2006 | Tajima et al. .................. | 60/706 |
| 7,219,000 B2 * | 5/2007 | Steinmetz et al. ............. | 701/51 |
| 7,448,981 B2 * | 11/2008 | Mashiki ......................... | 477/3 |
| 2008/0234097 A1 * | 9/2008 | Sah ................................ | 477/3 |
| 2009/0112416 A1 * | 4/2009 | Heap et al. .................... | 701/54 |
| 2009/0112419 A1 * | 4/2009 | Heap et al. .................... | 701/55 |

* cited by examiner

*Primary Examiner*—Dirk Wright

(57) ABSTRACT

A control system is provided to effect a method to control torque output from a two-mode, compound-split, electro-mechanical transmission during gear-to-gear shifting event when an off-going torque-transfer device is disengaged. It includes a computer program which controls transmission operation. A predetermined preferred torque output from the transmission device is determined. Torque output from torque-generative devices device is controlled. Torque transmitted across a selectively actuated torque transfer device is controlled, and limited based upon available battery power. Actuation of the oncoming torque-transfer device is preferably based upon a temperature of the device during the shifting event. The temperature during the shifting event is determined based upon a rotational speed of an input shaft to the transmission and an elapsed time to shift.

22 Claims, 3 Drawing Sheets

APPARATUS AND METHOD TO CONTROL TRANSMISSION TORQUE OUTPUT DURING A GEAR-TO-GEAR SHIFT

TECHNICAL FIELD

This invention pertains generally to powertrain control systems for fuel/electric hybrid powertrain systems, and more specifically to powertrain control during transmission shifts.

BACKGROUND OF THE INVENTION

Various hybrid powertrain architectures are known for managing the input and output torques of various torque-generative devices in hybrid vehicles, most commonly internal combustion engines and electric machines. One such hybrid powertrain architecture comprises a two-mode, compound-split, electro-mechanical transmission which utilizes an input member for receiving motive torque from a prime mover power source, typically an internal combustion engine, and an output member for delivering motive torque from the transmission to a driveline of the vehicle. First and second electrical machines are operatively connected to an electrical energy storage device for interchanging electrical power therebetween. The first and second electrical machines comprise motor/generators operable to transform the electrical power to motive torque for input to the transmission, independently of torque input from the internal combustion engine. The first and second electrical machines are further operable to transform vehicle kinetic energy, transmitted through the vehicle driveline, to electrical energy potential that is storable in the electrical energy storage device. A control unit is provided for regulating the electrical power interchange between the electrical energy storage device and the first and second electrical machines.

Engineers implementing powertrain systems including transmissions are tasked with developing gear shifting schemes. Such transmission systems typically include devices able to operate in one of a plurality of fixed-gear modes, wherein shifting between the fixed gears occurs in response to predetermined operating conditions, and often not involving an overt request for shift from a vehicle operator.

In fixed gear operation, the internal combustion engine operates by providing an input speed and torque to the transmission device. The transmission input speed is equal to transmission output speed multiplied by the initial fixed gear ratio. When a shift is commanded, torque is off-loaded from a currently applied clutch. When an oncoming clutch is applied, the transmission input speed, coming from the internal combustion engine, needs to match the transmission output speed multiplied by the oncoming gear ratio. When the input speed from the engine does not match the transmission output speed multiplied by the oncoming gear ratio, driveline jerks, clutch slippage, and other problems leading to customer dissatisfaction occur. Furthermore, such actions as driveline jerks and clutch slippage may affect operating temperatures of the transmission clutches, and therefore clutch durability. On a hybrid powertrain system having a plurality of torque-generative devices, there are additional variables and degrees of freedom affecting operation of the powertrain which must be considered and managed during shift operation.

Therefore, there is a need to for a method and apparatus to control powertrain operation during gear shifting events for a hybrid powertrain system, to address concerns mentioned hereinabove.

SUMMARY OF THE INVENTION

In order to address the concerns raised hereinabove, an article of manufacture is provided to effect a method to control torque output from a transmission device of an exemplary powertrain during a gear-to-gear shifting event when an off-going torque-transfer device is disengaged.

In accordance with the present invention, the exemplary powertrain system comprises a plurality of torque-generative devices each operable to supply motive torque to the transmission device and vehicle driveline, and the exemplary transmission device comprises a two-mode, compound-split, hybrid electro-mechanical transmission having four fixed gear ratios. There is a plurality of gears operable to transmit torque between the transmission device and an output shaft using a plurality of torque-transfer devices. The torque-generative devices preferably comprise a pair of electrical machines and an internal combustion engine. Torque transmission can be in the form of transmitting motive torque from one of the torque-generative devices through the transmission to the vehicle driveline.

An aspect of the invention includes the aforementioned article of manufacture comprising a storage medium having a computer program encoded therein for effecting the method, wherein the storage medium is integrated in an electronic control system. The method is preferably executed as a computer program in a distributed electronic control system which controls operation of the transmission. The method first comprises a predetermined preferred torque output from the transmission device. Torque output from each of a plurality of torque-generative devices operative to transmit motive torque to the transmission device is controlled during the shift. Torque transmitted across a selectively actuated torque transfer device is controlled preferably to substantially meet the predetermined preferred torque output from the transmission device.

An aspect of the invention includes the transmission comprising a two-mode, compound-split, electro-mechanical transmission, wherein the torque-generative devices comprise electrical machines. The motive torque output from the electrical machines operative to transmit motive torque to the transmission device is limited based upon available battery power. The electrical machines are each operable to independently transmit motive torque to the transmission.

Another aspect of the invention comprises the transmission device including four torque-transfer devices operative to control the transmission in operating ranges of at least four fixed-gear modes and two continuously variable modes.

Another aspect of the invention includes the torque-generative devices further comprising an internal combustion engine.

Another aspect of the invention includes the transmission operable to provide motive torque to a driveline of a vehicle.

Another aspect of the invention includes the predetermined preferred torque output from the transmission device comprising a series of time-based values for output torque derived based upon operator expectations during a shifting event.

Another aspect of the invention includes controlling actuation of the torque-transfer device based upon a temperature of the selectively actuated torque-transfer device during the shifting event. The temperature of the selectively actuated torque-transfer device during the shifting event is determined based upon a rotational speed of an input shaft to the transmission and an elapsed time to shift.

Another aspect of the invention includes controlling actuation of the torque-transfer device based upon slippage of the selectively actuated torque-transfer device during the shifting event. This includes controlling torque transmitted across the selectively actuated torque transfer device based upon a temperature of the torque transfer device during the shift event.

Another aspect of the invention includes determining the temperature of the torque transfer device during the shift event based upon rotation of an input shaft to the transmission and an elapsed time to shift.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
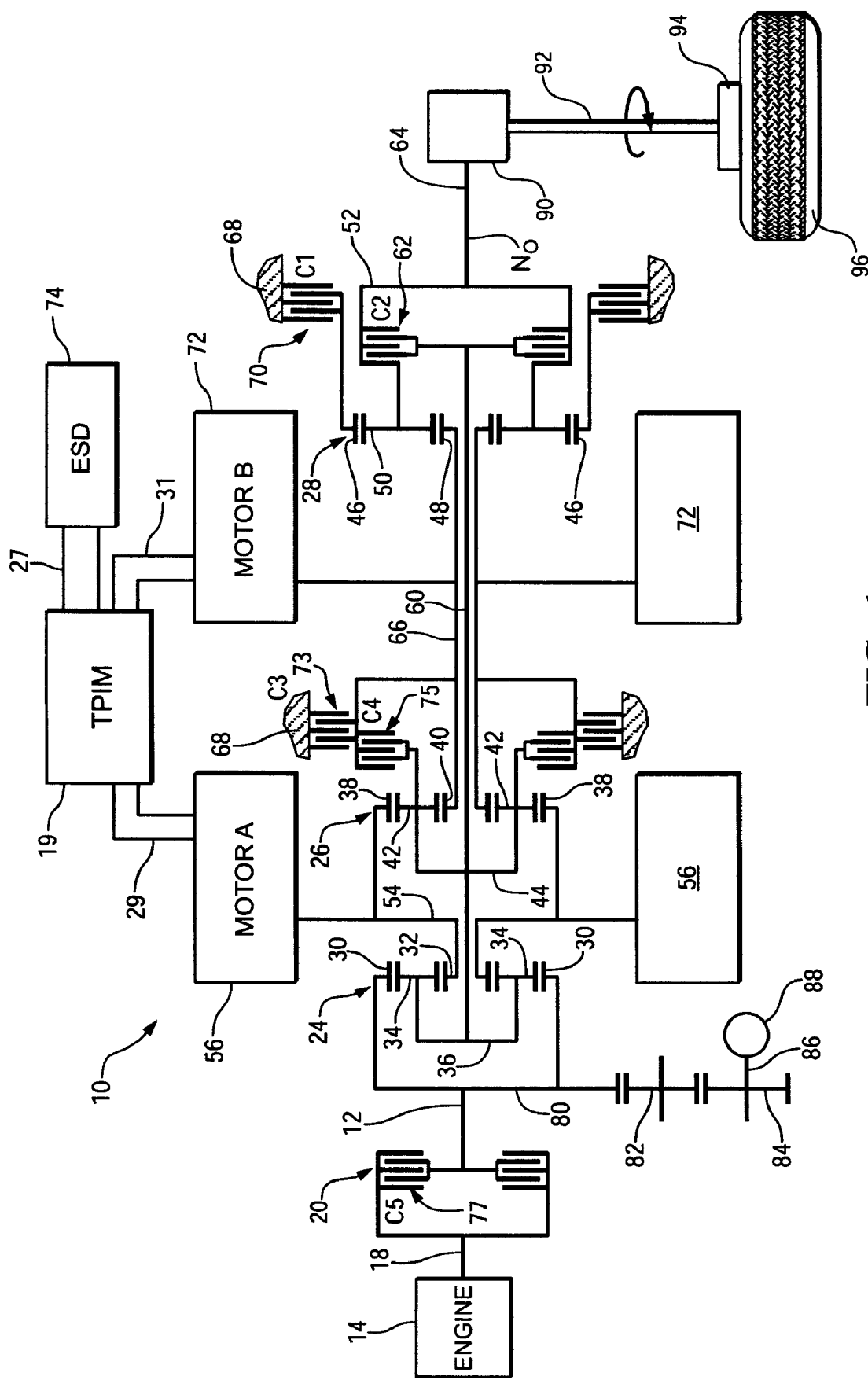
FIG. 1 is a schematic diagram of an exemplary powertrain, in accordance with the present invention.
Figure 2:
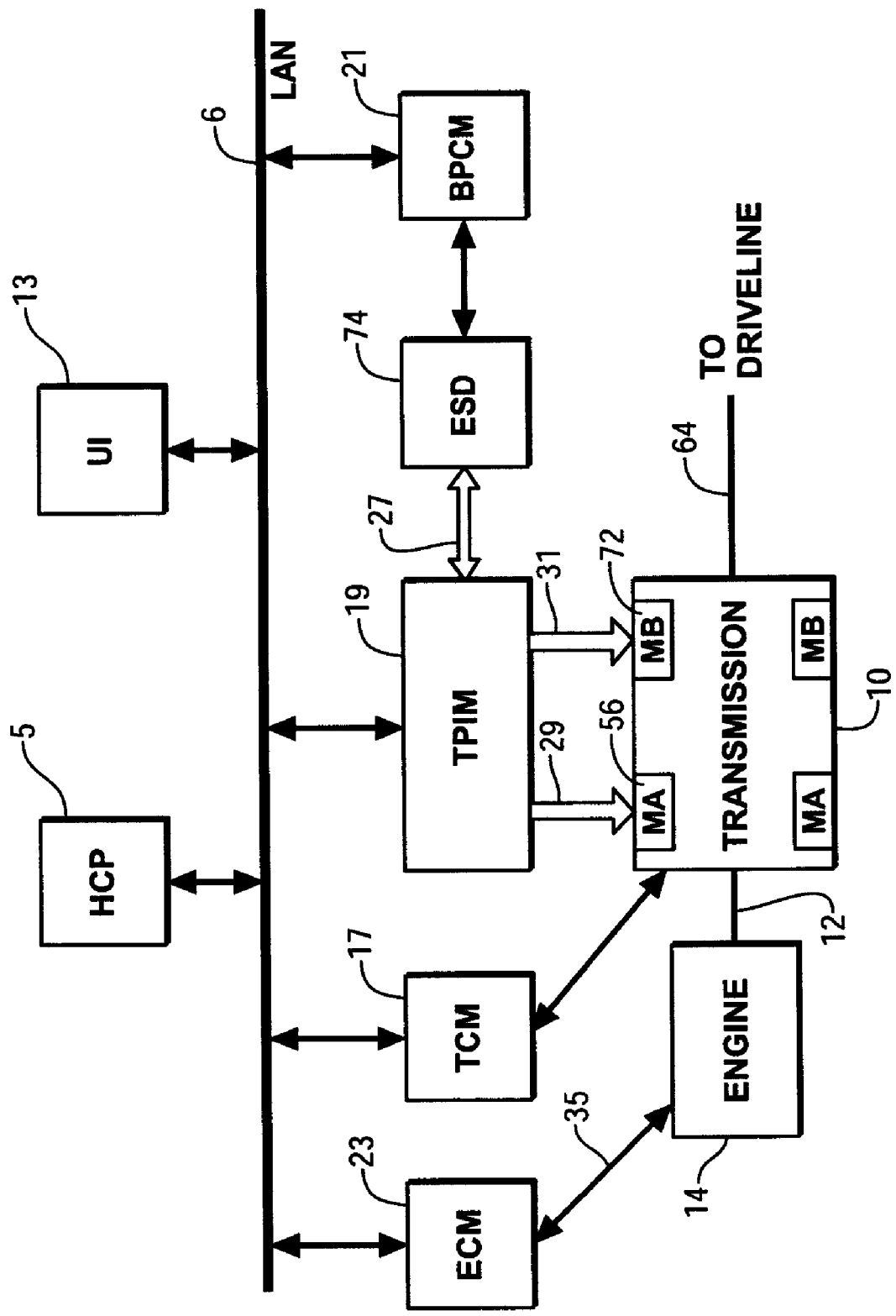
FIG. 2 is a schematic diagram of an exemplary architecture for a controller and powertrain, in accordance with the present invention; and, FIGS. 3A, 3B, and 3C comprise exemplary data graphs, in accordance with the present invention.

Referring now to the drawings, wherein the showings are for the purpose of illustrating the invention only and not for the purpose of limiting the same, FIGS. 1 and 2 show a system comprising an engine 14, transmission 10, control system, and driveline which has been constructed in accordance with an embodiment of the present invention.

Mechanical aspects of exemplary transmission 10 are disclosed in detail in commonly assigned U.S. Patent Application Publication No. U.S. 2005/0137042 A1, published Jun. 23, 2005, entitled Two-Mode, Compound-Split, Hybrid Electro-Mechanical Transmission having Four Fixed Ratios, which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring, shown respectively as 78 and 79. The transient torque damper 20 permits selective engagement of the engine 14 with the transmission 10, but it must be understood that the torque transfer device 77 is not utilized to change, or control, the mode in which the transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a power output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the transmission 10 utilizes three planetary-gear sets 24, 26 and 28. The first planetary gear set 24 has an outer ring gear member 30 which circumscribes an inner, or sun gear member 32. A plurality of planetary gear members 34 is rotatably mounted on a carrier 36 such that each planetary gear member 34 meshingly engages both the outer gear member 30 and the inner gear member 32.

The second planetary gear set 26 also has an outer ring gear member 38, which circumscribes an inner sun gear member 40. A plurality of planetary gear members 42 is rotatably mounted on a carrier 44 such that each planetary gear 42 meshingly engages both the outer gear member 38 and the inner gear member 40.

The third planetary gear set 28 also has an outer ring gear member 46, which circumscribes an inner sun gear member 48. A plurality of planetary gear members 50 is rotatably mounted on a carrier 52 such that each planetary gear 50 meshingly engages both the outer gear member 46 and the inner gear member 48.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined through a hub plate gear 54 to the outer gear member 38 of the second planetary gear set 26. The conjoined inner gear member 32 of the first planetary gear set 24 and the outer gear member 38 of the second planetary gear set 26 are connected to a first electrical machine comprising a motor/generator 56, also referred to as "MG-A".

The planetary gear sets 24 and 26 are further compounded in that the carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through a torque transfer device 62 which, as will be hereinafter more fully explained, is employed to assist in the selection of the operational modes of the transmission 10. The carrier 52 of the third planetary gear set 28 is connected directly to the transmission output member 64.

In the embodiment described herein, wherein the transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 may be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the transmission 10. The sleeve shaft 66 is also connected to a second electrical machine comprising a motor/generator 72, referred to as MG-B.

All the planetary gear sets 24, 26 and 28 as well as MG-A and MG-B 56 and 72 are coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. A resolver 80 is attached to each of the MG-A and MG-B, as described hereinbelow.

A torque transfer device C3 73 selectively connects the sun gear 40 with ground, i.e., with transmission housing 68. A torque transfer device, i.e. C4 75 is operative as a lock-up clutch, locking planetary gear sets 24, 26, MG-A and MG-B 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump when a corresponding clutch control solenoid is actuated. Hydraulic actuation of each of the clutches is accomplished using a known hydraulic fluid circuit having a plurality of clutch-control solenoids, which is not described in detail herein.

The transmission 10 receives input motive torque from the torque-generative devices, including the engine 14 and the electrical machines 56 and 72, as a result of energy conversion from fuel or electrical potential stored in an electrical energy storage device (ESD) 74. The ESD 74 typically comprises one or more batteries. Other electrical energy and electro-chemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective electrical machine, i.e. MG-A and MG-B, over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, MG-A 56 and MG-B 72 are three-phase AC machines and the inverters comprise complementary three-phase power electronics.

Referring again to FIG. 1, a drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the electrical machines 56 and/or 72 through planetary gear sets 24 and/or 26. The drive gear 80 meshingly engages an idler gear 82 which, in turn, meshingly engages a transfer gear 84 that is secured to one end of a shaft 86. The other end of the shaft 86 may be secured to a hydraulic/transmission fluid pump and/or power take-off ('PTO') unit, designated either individually or collectively at 88, and comprise an accessory load.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal; transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an engine torque command, clutch torque commands, $T_{CL\_N}$ for the various clutches C1, C2, C3, C4 of the transmission 10; and motor torque commands, $T_A$ and $T_B$, for MG-A and MG-B, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, and an indication of actual engine torque, $T_I$ input to the transmission, which is communicated to the HCP 5. For simplicity, ECM 23 is shown generally having bi-directional interface with engine 14 via aggregate line 35. Various other parameters that may be sensed by ECM 23 include engine coolant temperature, engine input speed ($N_I$) to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N\_EST}$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, battery voltage, $V_{BAT}$, and available battery power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for MG-A 56 and MG-B 72, $T_A$ and $T_B$, based upon input from the HCP 5, which is driven by operator input through UI 13 and system operating parameters. The motor torque commands for MG-A and MG-B, i.e. $T_A$ and $T_B$, are implemented by the control system, including the TPIM 19, to control MG-A and MG-B. Individual motor speed signals, $N_A$ and $N_B$ for MG-A and MG-B respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$ at shaft 64. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, $T_O$, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in the table indicate which of the specific clutches C1, C2, C3, C4 are engaged or actuated for each of the operating modes. Additionally, in various transmission operating modes, MG-A and MG-B may each operate as electrical motors to generate motive torque, or as a generator to generate electrical energy. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when MG-A and MG-B 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of machines MG-A and MG-B 56 and 72, which can be referred to as a continuously variable transmission mode. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of machines MG-A and MG-B 56, 72 are dependent on internal rotation of the mechanism as defined by the clutching and proportional to the input speed, $N_I$, determined or measured at shaft 12. The machines MG-A and MG-B operate as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from the energy storage device 74.

The transmission operating mode can be switched between Fixed Ratio operation and continuously variable Mode operation by activating or deactivating one the additional clutches during Mode I or Mode II operation. Determination of operation in fixed ratio mode or continuously variable mode is by algorithms executed by the control system, and is outside the scope of this invention.

The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Output of the exemplary powertrain system described hereinabove is constrained due to mechanical and system limitations. The output speed, $N_o$, of the transmission measured at shaft 64 is limited due to limitations of engine output speed, $N_E$, measured at shaft 18, and transmission input speed, $N_I$, measured at shaft 12, and speed limitations of the MG-A and MG-B, designated as $+/-N_A$, $+/-N_B$. Output torque, $T_o$, of the transmission 64 is similarly limited due to limitations of the engine input torque, $T_E$, and input torque, $T_I$, measured at shaft 12 after the transient torque damper 20, and torque limitations ($T_{A\_MAX}$, $T_{A\_MIN}$, $T_{B\_MAX}$, $T_{B\_MIN}$) of MG-A and MG-B 56, 72.

In operation, a shift occurs in the exemplary transmission due to a change in operator demand for output torque, typically communicated through inputs to the UI 13, including the accelerator pedal, the brake pedal, the transmission gear selector, and, the vehicle speed cruise control system. Additionally, a change in demand for output torque may be predicated on a change in external conditions, including, e.g. changes in road grade, road surface conditions, or wind load. Furthermore, a change in demand for output torque may be predicated on a change in powertrain torque demand caused by a controller command to change one of the electrical machines between electrical energy generating mode and torque generating mode. The distributed control architecture acts in concert to determine a need for a change in transmission operating gear, and executes the forgoing to effect the change in gear.

Figure 3A:
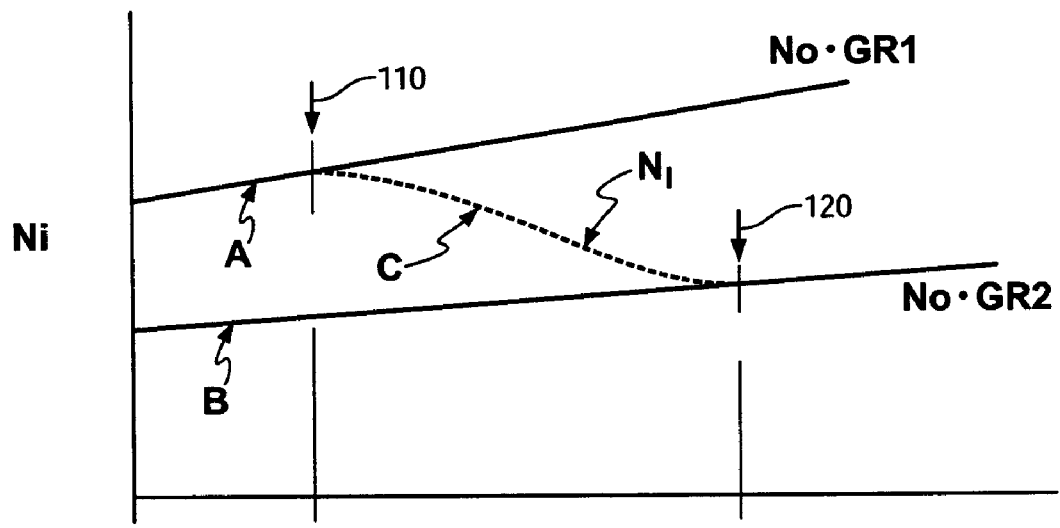

Referring now to FIG. 3, a graphical depiction of an element of a fixed gear-to-fixed gear shifting event is now described, comprising controlling operation of various machines and actuators of the aforementioned powertrain system. Referring specifically to FIG. 3A, graphs of input speed, $N_I$, as a function of time, are shown for operation of the exemplary powertrain system. Line A comprises a depiction of input speed, $N_I$, showing a relationship with transmission output, $N_o$, multiplied by the first gear ratio, GR1, previously described with reference to Table 1. Line B comprises a depiction of input speed, $N_I$, showing a relationship with transmission output, $N_o$, multiplied by the second gear ratio, GR2, also previously described with reference to Table 1. Line C comprises a depiction of input speed, $N_I$ during a shift event, wherein there is a controlled transition from operation in the first gear ratio GR1 to operation in the second gear ratio GR2, beginning at time point 110 and ending at time point 120.

Figure 3B:
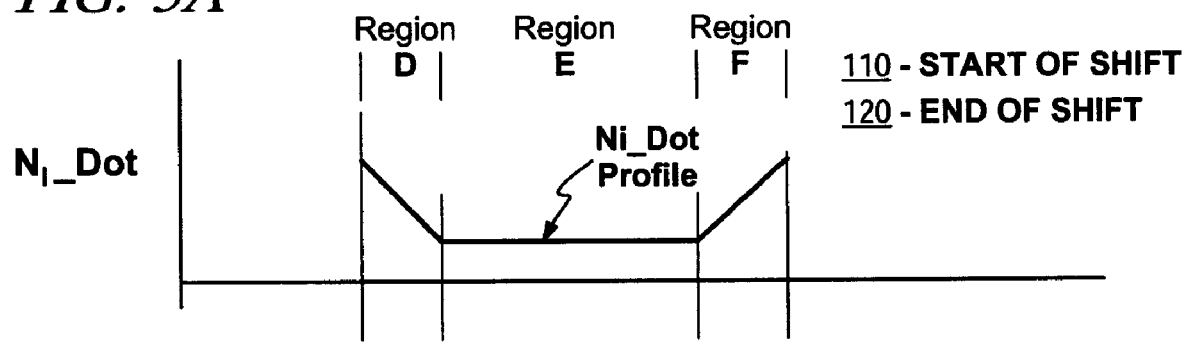

Referring specifically to FIG. 3B, a profile of a change in input speed, $N_I\_dot$ during the shift transition operation is shown, wherein there are three distinct regions of operation of changes in the input speed, $N_I\_dot$. The three regions of operation preferably comprise: Region D, wherein $N_I\_dot$ is decreasing, indicating a deceleration of the engine input to the transmission; Region E, wherein $N_I\_dot$ is a constant value; and, Region F, wherein $N_I\_dot$ is increasing, indicating an acceleration of the engine input to the transmission. The profile for $N_I\_dot$ is preferably a predetermined profile which is stored in the control system and executed to control operation of the engine during the shift event.

Figure 3C:
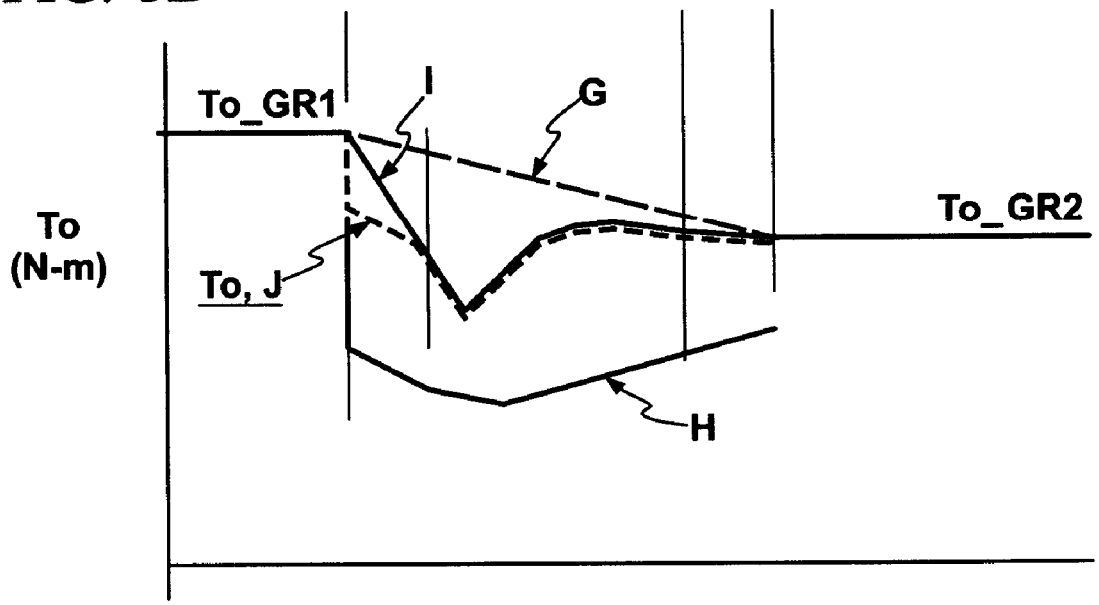

Referring specifically to FIG. 3C, a plurality of torque output graphs are depicted during the shift from the first fixed gear (shown herein for GR1) to the second fixed gear (shown herein for GR2). Line G comprises a torque profile comprising an idealized linear time-based interpolation of output torque between GR1 and GR2, wherein there is no consideration for system momentums and inertias, and restraints on outputs of the torque-generative devices. Line H comprises a torque profile for output torque based upon maximum torque-generating capabilities of the electric machines, MG-A 56 and MG-B 72, as further restrained by the output of the battery pack or ESD 74. Line H does not include torque generation by an oncoming clutch, in this case clutch C2. Line I comprises a calibrated time-based value of output torque $T_o$, which is derived based upon operator expectations for torque output to vehicle driveline during a shifting event. Line I is a predetermined profile for torque output from the transmission, preferably to shaft 64, stored in one of the control modules of the control system. The torque output is necessarily limited based upon torque-generative capacity of the system, including operating limits of the oncoming clutch, in this case C2.

The operating limits of the oncoming clutch are driven primarily by a limit on clutch energy. Clutch energy is driven by an increase in clutch temperature caused by clutch slippage, as is described hereinafter. Line J comprises a maximum executed torque output for operating the transmission, preferably derived based upon all of the aforementioned constraints, including the profile of change in input speed, $N_I\_dot$, the idealized linear time-based interpolation of the output torque, $T_o$, between GR1 and GR2, the output torque based upon maximum torque-generating capabilities of the electric machines, the calibrated time-based value of the output torque $T_o$, which is derived based upon operator expectations for torque output, and the operating limits of the oncoming clutch. This operation is described herein.

The relationships described with regard to FIG. 3 can be described mathematically, which can then be reduced to algorithms executable in the control system described above. A governing equation is shown below, in Eq. 1:

$$\begin{bmatrix} T_I \\ T_O \end{bmatrix} = \begin{bmatrix} C11 & C12 \\ C21 & C22 \end{bmatrix} * \begin{bmatrix} T_A \\ T_B \end{bmatrix} + \begin{bmatrix} D11 & D12 \\ D21 & D22 \end{bmatrix} * \begin{bmatrix} Ni\_dot \\ No\_dot \end{bmatrix} + \begin{bmatrix} K_I \\ K_O \end{bmatrix} * T_{c\_on} \quad [1]$$

wherein:

$T_I$ and $T_o$ are input and output torques of the transmission, respectively;

$T_A$ and $T_B$ are output torques of MG-A and MG-B, respectively;

$T_{C\_ON}$ is torque of the oncoming clutch, e.g. C2 for G2 in this example; and C11, C12, C21, C22, D11, D12, D21, D22, $K_I$, and $K_o$ comprise experimentally derived scalar values.

Eq. 1 is reduceable to:

$$\begin{bmatrix} T_I \\ T_O \end{bmatrix} = \begin{bmatrix} T_I M \\ T_O M \end{bmatrix} + \begin{bmatrix} T_I N \\ T_O N \end{bmatrix} + \begin{bmatrix} T_I C \\ T_O C \end{bmatrix} \quad [2]$$

wherein:

$T_I M$, $T_o M$ represent the input and output motor torques, $T_I N$, $T_o N$ represent input and output transmission torques; and, $T_I C$ and $T_o C$ represent the oncoming clutch torques.

Eq. 2 is reduceable to:

$$\begin{bmatrix} T_I \\ T_O \end{bmatrix} = \begin{bmatrix} T_I X \\ T_O X \end{bmatrix} + \begin{bmatrix} T_I C \\ T_O C \end{bmatrix} \quad [3]$$

An important practical significance of the values for Eq. 3 includes that a maximum value for the ToX factor is represented by Line H of FIG. 3C.

Referring again to FIG. 3 and Eqs. 1, 2, and 3, the value for $N_I$ dot is a known calibration, and $N_o$ dot is a readily measurable value, measured at output shaft 64. Values for $T_A$ and $T_B$ are known, measured values by measuring current through the TPIM to each of MG-A and MG-B. Therefore, a range of needed values for oncoming clutch torque, $T_{C\_ON}$ is determinable and calculable.

Once the range of needed values for oncoming clutch torque, $T_{C\_ON}$ is determined, the limitations based upon clutch torque energy can be derived, resulting in the desired output torque shown with reference again to Line I of FIG. 3C. The operating limits of the oncoming clutch, in this case C2 are determined as follows, driven primarily by a limit on clutch energy, due to an increase in clutch temperature caused by clutch slippage. This determination of allowable energy is now described by way of example. The exemplary clutch, C2, has a maximum allowable operating temperature range from 80 C to 250 C, over an associated thermal capacity of 20 kilojoules (kJ). Clutch temperature can be estimated based upon operating temperature of the transmission and other factors. It is estimated, for sake of calculation, as 150 C in this instance, which means the remaining clutch energy is 20* (100/170) or about 12 kJ. It is assumed that a shift event requires an elapsed time of one half second, or 500 milliseconds. During the elapsed time in which the shift event occurs, clutch slippage is determined based upon the $N_I$ dot profile, and the output speed and oncoming gear ratio, $N_o$*GR2. Using known relationships between power, energy, and time, it can be readily determined that clutch energy, in the form of slippage and clutch friction, must not exceed a maximum value of 160 N-m in this example in order to maintain physical integrity of the clutch device. The oncoming clutch torque, Tc_on, can be determined based thereupon.

It is understood that application-specific masses, inertias, friction factors, and other characteristics and parameters of the driveline affect various powertrain and driveline operating states, and therefore the response times and magnitudes are intended to be exemplary, while still descriptive of the overall operation of the powertrain system.

As previously described, the transmission device 10 comprises a plurality of gears and torque-transfer devices operable to transmit torque between the torque-generative devices 14, 56, 72 and the output shaft 64 and drive wheels 96 of the driveline. Torque transmission may comprise transfer of motive torque from one or more of the torque-generative devices 14, 56, 72 to the driveline. Torque transmission may comprise transfer of torque from the drive wheels 96 via the driveline and transmission to one or more of the torque-generative devices 14, 56, 72 as a result of a process commonly referred to as engine-braking. In this configuration, engine-braking comprises transmitting at least a portion of driveline torque resulting from vehicle momentum from the output shaft 64 through torque-transfer devices, i.e., clutches C1, C2, C3, C4, to the torque-generative devices 14, 56, 72. The transmitted torque is absorbed by the powertrain in the form of electrical energy generation through MG-A and MG-B, and, engine braking through the internal combustion engine 14.

It is understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having a computer program encoded therein for effecting a method to control torque output from a transmission device during a gear-to-gear shifting event when an off-going torque-transfer device is disengaged, the program comprising:

code comprising a predetermined preferred torque output from the transmission device;

code to control torque output from each of a plurality of torque-generative devices operative to transmit motive torque to the transmission device; and, code to control torque transmitted across a selectively actuated torque transfer device.

2. The article of manufacture of claim 1, wherein the code to control torque transmitted across a selectively actuated torque transfer device further comprises code to control torque output from each of the torque-generative devices to substantially match the predetermined preferred torque output from the transmission device.

3. The article of manufacture of claim 2, wherein the transmission comprises a two-mode, compound-split, electro-mechanical transmission.

4. The article of manufacture of claim 3, wherein the torque-generative devices comprise electrical machines.

5. The article of manufacture of claim 4, further comprising the plurality of torque-generative devices operative to transmit motive torque to the transmission device wherein the motive torque is limited based upon battery power.

6. The article of manufacture of claim 5, wherein the electrical machines are each operable to independently transmit motive torque to the transmission device.

7. The article of manufacture of claim 6, wherein the torque-generative devices further comprise an internal combustion engine.

8. The article of manufacture of claim 3, wherein the two-mode, compound-split, electro-mechanical transmission comprises a transmission including four torque-transfer devices operative to control the transmission in operating ranges comprising four fixed-gear modes and two continuously variable modes.

9. The article of manufacture of claim 8, wherein the powertrain system is operable to provide motive torque to a driveline of a vehicle.

10. The article of manufacture of claim 1, wherein the code comprising a predetermined preferred torque output from the transmission device comprises a series of time-based values for output torque derived based upon operator expectations during a shifting event.

11. The article of manufacture of claim 1, wherein the code to control torque transmitted across the selectively actuated torque transfer device further comprises code to control actuation of the torque-transfer device based upon a temperature of the selectively actuated torque-transfer device during the shifting event.

12. The article of manufacture of claim 11, wherein the temperature of the selectively actuated torque-transfer device during the shifting event is determined based upon a rotational speed of an input shaft to the transmission and an elapsed time to execute the shift event.

13. The article of manufacture of claim 1, wherein the code to control torque transmitted across the selectively actuated torque transfer device further comprises code to control actuation of the torque-transfer device based upon slippage of the selectively actuated torque-transfer device during the shifting event.

14. Control system, for a powertrain comprising a plurality of torque-generative devices operatively connected to a power transmission device operable in a plurality of fixed gear ratios each fixed gear ratio effected by selective actuation of a plurality of torque-transfer devices, the control system operable to execute a computer program to effect a method to control torque output from the power transmission device during a gear-to-gear shifting event when an off-going torque-transfer device is disengaged, the computer program comprising:
  code comprising a predetermined preferred torque output from the transmission device;
  code to control torque output from each of the torque-generative devices operative to transmit motive torque to the transmission device; and,
  code to control torque transmitted across a selectively actuated torque transfer device to optimize an operating temperature of the selectively actuated torque-transfer device.

15. The control system of claim 14, further comprising code to control torque output from each of the torque-generative devices operative to transmit motive torque to the transmission device during the shifting event.

16. The control system of claim 15, further comprising the control system operable to control torque output from each of the torque-generative devices and the selectively actuated torque-transfer device to substantially match the predetermined preferred torque output from the transmission device.

17. The control system of claim 16, wherein the torque-generative devices comprise an internal combustion engine, a first electrical machine, and a second electrical machine.

18. The control system of claim 14, wherein the magnitude of torque transmitted from the first and second electrical machines is determined based upon available electrical power transmittable from an electrical energy storage device.

19. Method for controlling torque output from a transmission device during a gear-to-gear shifting event when an off-going torque-transfer device is disengaged, comprising:
  predetermining a preferred torque output from the transmission device;
  controlling torque output from each of a plurality of torque-generative devices operative to transmit motive torque to the transmission device; and,
  controlling torque transmitted across a selectively actuated torque transfer device.

20. The method of claim 19, wherein controlling torque output from each of the plurality of torque-generative devices operative to transmit motive torque to the transmission device further comprises limiting torque output from each of the torque-generative devices based upon available battery power when the torque-generative devices comprise electrical machines.

21. The method of claim 20, wherein controlling torque transmitted across the selectively actuated torque transfer device further comprises controlling actuation of the torque transfer device based upon a temperature of the torque transfer device during the shift event.

22. The method of claim 21, further comprising determining the temperature of the torque transfer device during the shift event based upon rotation of an input shaft to the transmission and an elapsed time to shift.

* * * * *